US009458017B2

(12) United States Patent
Piazza

(10) Patent No.: US 9,458,017 B2
(45) Date of Patent: Oct. 4, 2016

(54) CARBON NANOTUBES CONFORMALLY COATED WITH DIAMOND NANOCRYSTALS OR SILICON CARBIDE, METHODS OF MAKING THE SAME AND METHODS OF THEIR USE

(71) Applicant: PONTIFICIA UNIVERSIDAD CATÓLICA MADRE Y MAESTRA, Santiago de los Caballeros (DO)

(72) Inventor: Fabrice Piazza, Santiago de los Caballeros (DO)

(73) Assignee: PONTIFICIA UNIVERSIDAD CATOLICA MADRE Y MAESTRA, Santiago de los Caballeros (DM)

( * ) Notice: Subject to any disclaimer, the term of this patent is extended or adjusted under 35 U.S.C. 154(b) by 337 days.

(21) Appl. No.: 14/079,546

(22) Filed: Nov. 13, 2013

(65) Prior Publication Data

US 2014/0212640 A1    Jul. 31, 2014

Related U.S. Application Data

(60) Provisional application No. 61/726,473, filed on Nov. 14, 2012.

(51) Int. Cl.
*C01B 31/02* (2006.01)
*B82Y 30/00* (2011.01)
*B82Y 40/00* (2011.01)

(52) U.S. Cl.
CPC ............ *C01B 31/0253* (2013.01); *B82Y 30/00* (2013.01); *B82Y 40/00* (2013.01); *Y10T 428/24893* (2015.01); *Y10T 428/2918* (2015.01)

(58) Field of Classification Search
CPC .............. Y10T 428/24802; Y10T 428/24893; C01B 31/0253; B82Y 30/00; B82Y 40/00
See application file for complete search history.

(56) References Cited

U.S. PATENT DOCUMENTS

| 6,882,094 | B2* | 4/2005 | Dimitrijevic .......... B82Y 10/00 313/309 |
| 7,572,332 | B2* | 8/2009 | Gruen ..................... H01L 35/22 117/4 |
| 2006/0222850 | A1 | 10/2006 | Xiao et al. | |
| 2012/0064341 | A1 | 3/2012 | Zou et al. | |

FOREIGN PATENT DOCUMENTS

| EP | 2 244 538 A2 | 10/2010 |
| EP | 2 492 241 A1 | 8/2012 |

(Continued)

OTHER PUBLICATIONS

Berlin, Jana, "Analysis of Boron with Energy Dispersive X-ray spectrometry" in Imaging & Microscopy; vol. 13, May 2011, p. 19-21.*

(Continued)

*Primary Examiner* — Gerard Higgins
(74) *Attorney, Agent, or Firm* — Squire Patton Boggs (US) LLP

(57) ABSTRACT

Provided herein are carbon nanotubes conformally coated with diamond nanocrystals or silicon carbide, or both, methods of their preparation, methods of their use and compositions and materials comprising the conformally coated carbon nanotubes.

27 Claims, 10 Drawing Sheets

(56) References Cited

FOREIGN PATENT DOCUMENTS

| JP | 2005-75720 A | 3/2005 |
| WO | WO 01/61719 A1 | 8/2001 |

OTHER PUBLICATIONS

Guglielmotti et al., Carbon nanotube/nanodiamond structures: An innovative concept for stable and ready-to-start electron emitters (2009) *Applied Physics Letters* 95:222113.

Gupta et al., A New Technique for Coating Silicon Carbide Onto Carbon Nanotubes Using a Polycarbosilane Precursor (2009) *Silicon* 1:125-129.

Hou et al., Preparation of diamond films by hot filament chemical vapor deposition and nucleation by carbon nanotubes (2002) *Applied Surface Science* 185:303-308.

Morisada et al., SiC-coated carbon nanotubes and their application as reinforcements for cemented carbides (2004) *Materials Science and Engineering A* 381:57-61.

Piazza et al., Carbon Nanotubes Coated with Nanocrystalline Diamond at Low Substrate Temperature from a New Method, 8th International and Interdisciplinary Science Research Congress, Santo Domingo, Jun. 14, 2012.

Piazza et al., Carbon Nanotubes Coated with Nanocrystalline Diamond at Low Substrate Temperature, XXI International Materials Research Congress (IMRC) Aug. 12-17, 2012.

Shankar et al., Growth of nanodiamond/carbon-nanotube composites with hot filament chemical vapor deposition (2008) *Diamond & Related Materials* 17:79-83.

Shankar, Nagraj (2004) Ph.D. Dissertation, University of Illinois at Urbana-Champaign.

Sun et al., Diamond Nanorods from Carbon Nanotubes (2004) *Advanced Materials* 16:1849-1853.

Sun et al., Nanocrystalline diamond from carbon nanotubes (2004) *Applied Physics Letters* 84:2901-2903.

Terranova et al., Controlled Evolution of Carbon Nanotubes Coated by Nanodiamond: the Realization of a New Class of Hybrid Nanomaterials (2005) *Chemistry of Materials* 17:3214-3220.

Xiao et al., Synthesis of a Self-Assembled Hybrid of Ultrananocrystalline Diamond and Carbon Nanotubes (2005) *Advanced Materials* 17:1496-1500.

International Search Report and Written Opinion in PCT/IB2013/003101, mailed Jun. 20, 2014, 15 pages.

Orlanducci et al., Nanodiamond-Coated Carbon Nanotubes: Early Stage of the CVD Growth Process (2008) *Chem. Vap. Deposition* 14:241-246.

\* cited by examiner

CARBON NANOTUBES CONFORMALLY COATED WITH DIAMOND NANOCRYSTALS OR SILICON CARBIDE, METHODS OF MAKING THE SAME AND METHODS OF THEIR USE

CROSS-REFERENCE TO RELATED APPLICATION

This application claims priority to U.S. Provisional Patent Application No. 61/726,473, filed Nov. 14, 2012, which is incorporated by reference in its entirety.

FIELD

Provided herein are carbon nanotubes conformally coated with diamond nanocrystals or silicon carbide or diamond nanocrystals and silicon carbide. Also provided herein are methods of making the conformally coated carbon nanotubes and methods of their use.

BACKGROUND

Carbon nanotubes (CNTs) coated by diamond nano-crystals (NCD) in a conformal manner are hybrid nanostructured carbon materials. They combine the structural, physical and chemical properties of both carbon allotropes in a wide range of applications. CNTs exhibit high tensile strength, radial elastic deformability and toughness, together with unique electronic transport properties. NCD films display high hardness and stiffness, low coefficient of friction, exceptional chemical inertness, biocompatibility, high thermal conductivity, negative electron affinity with proper treatment and high transparency in a wide range of wavelengths. CNTs coated with NCD in a conformal manner can provide advantageous properties such as thermo-resistance and enhanced field emission current properties including stable emission currents. They can be applied in diverse fields such as functional composite materials, field emissions and other electronic devices, biodevices, wear-resistant coatings, thermal management of integrated circuits, electrical field shielding and micro- and nano-electromechanical systems (MEMS/NEMS).

A few processes have been disclosed for elaborating nano-structured carbon material with diamond nanocrystals. However, these processes did not yield carbon nanotubes conformally coated with diamond nanocrystals (U.S. Patent Application Publication No. 2006/0222850 A1; Xiao et al., 2005, *Advanced Materials* 17:1496-1500; Shankar et al., 2008, *Diamond and Related Materials* 17:79-83).

Sun et al. obtained diamond nanocrystals (Sun et al., 2004, *Applied Physics Letters* 84:2901-2903) from multiwalled CNTs (MWCNTs) exposed for 10 hours to hydrogen plasma at a high substrate temperature, $T_S$, of 727° C. At this high temperature, the resulting CNTs were partially converted into amorphous carbon and thus were no longer tubular. Diamond nano-particle diameter ranged from 5 to 30 nm and corresponding nucleation density was estimated to be $10^{11}/cm^2$. If MWCNT plasma exposure duration was increased to 20 hours, diamond nano-particle grew into diamond nanowires, but diamond nucleation density was not increased significantly (Sun et al., 2004, *Advanced Materials* 16:1849-1853).

Shankar et al. used hot-filament chemical vapor deposition (HFCVD) to synthesize nanometer-sized diamond particles (2 to 20 nm) nucleating and growing radially outward on the surface of MWCNTs which were previously predispersed onto a silicon substrate. They identified a small parametric window in the diamond growth space-phase (2-5% $CH_4$ in $H_2$) wherein the CNTs were not destroyed and wherein their structure was partially preserved. As shown in FIG. 1 of Shankar et al., conformal coating was not achieved. In order to enhance nucleation density of diamond on CNTs, Shankar et al. studied the effects of substrate temperature, precursor concentration, CNT film thickness and pressure on nucleation density of diamond on CNTs. The conditions for maximum diamond nucleation density were found to correspond to cases where the CNTs were almost completely etched away by hydrogen radicals, which would indicate a limitation to achieve higher diamond nucleation density by this method and therefore a limitation to achieve conformal coating (Nagraj Shankar, 2004, PhD dissertation, University of Illinois at Urbana-Champaign). Indeed, CNTs have been used to enhance diamond nucleation on various substrates, in particular on substrates which neither dissolve carbon nor form carbide, such as copper; however, CNTs have not been shown to survive such processes (Hou et al., 2002, *Applied Surface Science* 185:303-308).

Terranova et al. reported on the growth of single-walled CNT (SWCNT) bundles coated by diamond nano-crystals in a conformal manner, at a high substrate temperature ($T_S$=900° C.), in one step, by a modified HFCVD process (Terranova et al., 2005, *Chemistry of Materials* 17:3214-3220). Carbon nano-powders were sprayed from holes along a nozzle. The spray intersected with a flux of atomic hydrogen from a heated filament that was located 6 mm away from a Si substrate coated with catalyst Fe nanoparticles for the growth of CNTs. SWCNT bundles (diameter <120 nm) were formed first, followed by NCD coating. The reported size of the diamond grains with well-defined crystalline facets was 20-100 nm. However, this method suffers from important drawbacks. The substrate temperature ($T_S$=900° C.) was too high to maintain the integrity of the hybrid CNT/nanodiamond material with temperature sensitive substrate materials. The high synthesis substrate temperature ($T_S$=900° C.) is prohibitive for low cost mass production. The method may suffer from lack of homogeneity and high potential contamination from the nozzle used in the setup. The setup includes additional components, as compared to conventional HFCVD process, which increase production cost. The method is not appropriate for mass production. The size of the diamond grains is 20-100 nm, which may result in insufficient conformal coating of CNT bundles. Sub 10 nm diamond grains are desirable to achieve a higher degree of conformal coating. For these reasons, the method disclosed by Terranova et al. might not be suitable to be scaled up and adapted to the requirements of various industries such as the electronics industry.

Later, Terranova et al., while exploring other routes of preparation of hybrid CNT/nanodiamond structures, which would be suitable to be scaled up and adapted to the requirements of the electronics industry, reported the coating of SWCNT bundles by a standard HFCVD process (Guglielmotti et al., 2009, *Applied Physics Letters* 95:222113). The SWCNT layers were deposited on Si(100) plates by drop casting of dispersions prepared adding 2 mg of the purified materials to 25 ml of methanol. The coating of the SWCNT bundles by diamond was carried out in an HFCVD reactor where the gaseous phase was activated by a tantalum (Ta) wire kept at 2200° C. The reactant used was a mixture of 1% $CH_4$ diluted in $H_2$. Gas flow and working pressure were 200 standard cubic centimeters per minute and 36 Torr, respectively. Substrate temperature was estimated to be 630°

C. The HFCVD process was performed for 30 min. According to the authors, the SWCNT bundles appeared uniformly coated by nano-grains, typically of the order of 10 nm. However, the published low-magnification scanning electron microscopy (SEM) images did not allow estimation of mean grain size. Transmission electron microscopy images were not provided. Reflection high energy electron diffraction analysis revealed rings characteristic of diamond phase. There was no commentary on the possible deposition of nano-crystalline SiC, which may form under those conditions, onto the CNT and substrate surface. From these results, it is not clear whether the diamond was deposited on the silicon substrate surface or on the surface of the SWCNT bundles. In any case, the substrate temperature remains prohibitive for various applications for which CNTs must be integrated with temperature sensitive substrate materials.

Conformal coating of CNTs with silicon carbide (SiC) is also of great interest for improving the chemical and physical properties of CNTs. For instance, CNTs conformally coated with SiC may be used for improving the thermo-oxidative stability of CNTs used as nano-reinforcements for metal, ceramic or polymer matrixes, or for improving the electron emission stability of CNTs used in field emission devices. Nanocrystalline SiC exhibits high elasticity, strength, chemical inertness, wide band gap, high electron mobility and thermal conductivity. However, similar to attempts to conformally coat CNTs with diamond, attempts to conformally coat CNTs with SiC have been performed at very high CNT temperatures that are impractical for many applications. For example, MWCNTs (40-1000 nm outer diameter) were coated with a nanometer-sized SiC layer by the reaction of SiO(g) and CO(g) at temperatures of 1150-1550° C. in vacuum (Morisada & Miyamoto, 2004, *Materials Science and Engineering A* 381:57-61). More recently, a similar result was achieved with MWCNTs of 15 nm external diameter, using polycarbosilane as precursor, heated at about 1300° C. under an inert atmosphere (Gupta et al., 2009, *Silicon* 1:125-129). As described above, the temperature used in these processes compromises the integrity of the CNTs and is completely incompatible with temperature-sensitive substrates.

In conclusion, until now, no method has been available to provide CNTs coated by diamond nanocrystals and/or SiC in a conformal manner at low pressure (around 10 Torr) and low temperature (below 360° C.) that is suitable to be scaled up and adapted to the requirements of various industries such as the electronics industry. In the methods to date, the high temperature required for the substrate and CNTs (above 630° C.) has made it impossible to coat CNTs located on many materials that would be destroyed or affected by this temperature. This restriction includes all polymeric materials, as well as many semiconductors and device structures.

There is need for an improved method of manufacturing CNTs coated by diamond nano-crystals and/or SiC in a conformal manner that will overcome the problems noted above to reduce cost, reduce waste, reduce components, improve conformal degree, and create the opportunity to deposit on temperature sensitive materials.

SUMMARY

Provided herein are carbon nanotubes conformally coated with diamond nanocrystals, silicon carbide or both. The conformally coated carbon nanotubes comprise detectable carbon nanotubes. In certain embodiments, the carbon nanotubes can be detected by one or more techniques known to those of skill in the art. The conformally coated carbon nanotubes are generally of uniform diameter. In certain embodiments, the conformally coated carbon nanotubes have a diameter between about 100 and about 200 nm. In certain embodiments, the coating comprises coating grains having an average size from about 2 nm to about 10 nm. In certain embodiments, the coating comprises both diamond nanocrystals and silicon carbide. In certain embodiments, the coating comprises at least about 35% diamond nanocrystals. In certain embodiments, the coating comprises at least about 35% silicon carbide. In certain embodiments, the coating comprises at least about 20% diamond nanocrystals and at least about 20% silicon carbide. In some embodiments, the coating comprises about 60% diamond nanocrystals and about 40% silicon carbide.

Also provided herein are materials coated with the conformally coated carbon nanotubes and materials comprising conformally coated carbon nanotubes. The materials can be any material deemed suitable by those of skill in the art. In advantageous embodiments, the material can be a polymeric material, a semiconductor material, a metal material, a ceramic material, or a device structure. In certain embodiments, the conformally coated carbon nanotubes can be dispersed within any suitable material, including but not limited to a polymeric material. Advantageously, the low temperatures provided herein allow coating of materials that otherwise would be too temperature-sensitive for coating with diamond- or silicon carbide-coated carbon nanotubes according to prior methods.

Also provided herein are consumer or industrial products comprising conformally coated carbon nanotubes. Such consumer or industrial products include but are not limited to technology utilizing semiconductors, such as an electronic device (e.g., computers, mobile phones, and the like).

Also provided herein are materials comprising carbon nanotubes coated by sub-10 nm diamond nanocrystals. These materials can be made, for example, by the method of providing a substrate, dispersing or growing carbon nanotubes on the surface of the substrate, and exposing the substrate to HFCVD with methane ($CH_4$) in hydrogen as the feeding gas for a sufficient time to coat the carbon nanotubes with sub-10 nm diamond nanocrystals at low carbon nanotube and substrate temperature. The low temperatures are less than about 360° C., for instance about 80° C.

Also provided herein are methods of making conformally coated carbon nanotubes. The methods can be carried out advantageously at low temperature, at low pressure or at both low temperature and low pressure. In certain embodiments, the conformally coated carbon nanotubes are prepared by chemical vapor deposition. In certain embodiments, a substrate is contacted with a carbon nanotube in a chemical vapor deposition chamber. The chamber can further contain a source, for example a solid carbon source, a solid silicon source, or both. The chamber can also contain a filament, for instance a tungsten filament, for hot filament chemical vapor deposition. In certain embodiments, the source is etched by hydrogen radicals. According to the methods provided herein, a hydrogen feed gas, which may be activated by the filament, is flowed over the source at a low temperature and a low pressure for a time sufficient to conformally coat the carbon nanotube with diamond nanocrystals, silicon carbide, or both diamond nanocrystals and silicon carbide. In some embodiments, at least about 60% of the carbon nanotubes used as starting materials are present after performing the method.

The compositions and methods provided herein can reduce the overall cost to conformally coat CNTs with diamond nano-crystals and/or silicon carbide. They can also increase growth rate, reduce waste, reduce the number of components needed, provide a better degree of conformal coating and create the opportunity to coat CNTs located on temperature sensitive substrates. Additional applications hitherto not possible because of high diamond and/or SiC synthesis temperatures also suggest themselves; for example, the use of CNTs coated by diamond and/or SiC crystals in functional composite materials, field emission and other electronic devices, micro- and nano- electromechanical systems (MEMS/NEMS), biodevices, wear-resistant coatings, thermal management of integrated circuits, electrical field shielding and sensors.

DESCRIPTION OF DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 depicts an inlet for hydrogen gas (1), a substrate (2), a tungsten filament (3), a graphite plate (4), a molybdenum holder (5), a boron nitride plate (6), a fluid cooling system (7), an outlet to a pump (8), and a movable substrate holder heater (9).

In FIG. 9A, the diffraction rings of the (111), (220), and (311) diamond planes are visible.

FIG. 9B provides a mono-crystalline diamond pattern.

DETAILED DESCRIPTION

Figure 1:
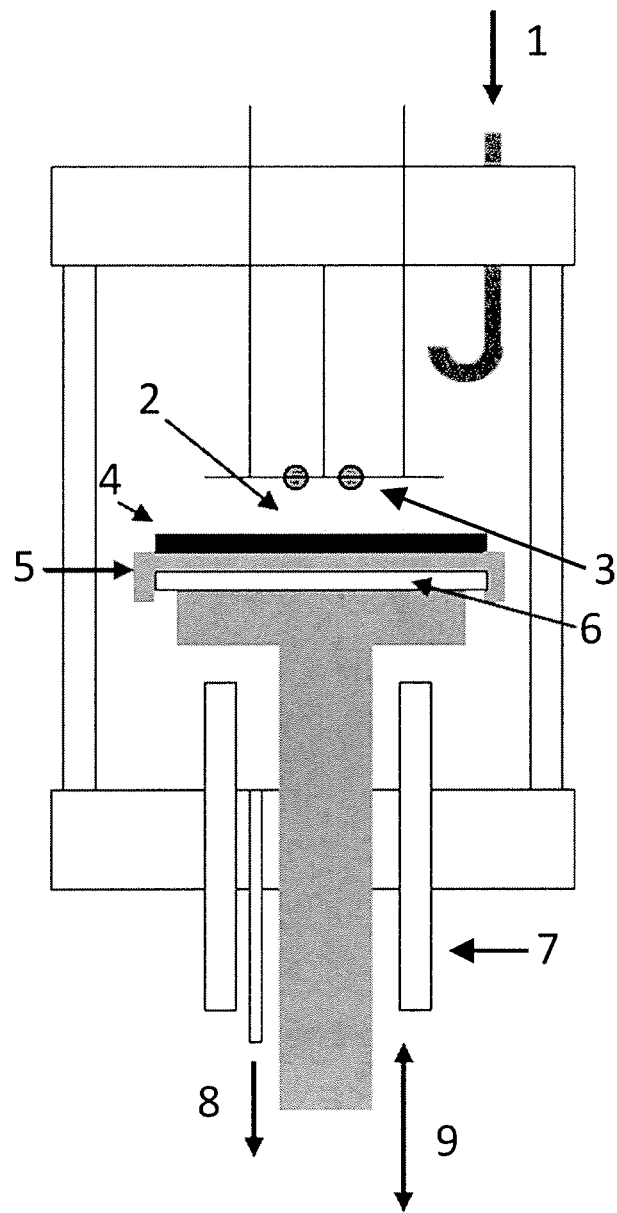
FIG. 1 provides a schematic of a hot-filament chemical vapor deposition (HFCVD) system useful for conformally coating carbon nanotubes (CNTs) by diamond nano-crystals and/or silicon carbide (SiC) at low CNT and substrate temperatures.

The compositions and methods provided herein are based, in part, on investigations of the use of a solid carbon source, instead of a conventional hydrocarbon gas precursor, for the growth of nano-crystalline diamond at low substrate temperature (e.g., $T_S$<360° C.), by hot-filament chemical vapor deposition (HFCVD). In the investigations, a solid graphite plate was used as the carbon source, and the silicon source came from the substrate itself. The only gas feed into the system was hydrogen. The substrate temperature was about 190° C. Continuous nanocrystalline diamond (NCD) thin films were obtained on various substrates, including copper, at $T_S$ about 190° C., by HFCVD from a solid carbon source and without any substrate pre-treatment to enhance nucleation density. Instead of using a conventional hydrocarbon gas precursor, a graphite substrate holder was used as carbon source with hydrogen as the only feeding gas. This method can provide short induction time, high nucleation density, and high conversion efficiency and growth rate, even at low substrate temperature. Also, by adding a silicon solid source, NCD and silicon carbide (SiC) composite films were grown at low substrate temperature. Accordingly, provided herein are carbon nanotubes conformally coated by diamond nanocrystals at low carbon nanotube temperature. Also, provided herein are carbon nanotubes conformally coated by diamond nano-crystals and silicon carbide (SiC) at low CNT and substrate temperature.

As used herein, the terms "conformal coating," "conformally coated" and variants thereof, refer to a coating that substantially covers a carbon nanotube. The substantiality of the coating can be measured by, for example, by examining the completeness of the coating along the walls of the carbon nanotubes, and determining the percent coverage of the coating. As provided herein, carbon nanotubes are conformally coated when the coating covers at least 75% of the carbon nanotube surface area over a length of at least 100 nm. In particular embodiments, the coating covers at least 80%, 85%, 90%, 95%, 96%, 97%, 98% or 99% of the carbon nanotube surface area over a length of at least 100 nm. In some embodiments, the coating covers at least 75%, 80%, 85%, 90%, 95%, 96%, 97%, 98% or 99% of the carbon nanotube surface area over a length of at least 250 nm. In some embodiments, the coating covers at least 75%, 80%, 85%, 90%, 95%, 96%, 97%, 98% or 99% of the carbon nanotube surface area over a length of at least 500 nm. In some embodiments, the coating covers at least 75%, 80%, 85%, 90%, 95%, 96%, 97%, 98% or 99% of the carbon nanotube surface area over a length of at least 1 µm. In some embodiments, the coating covers at least 75%, 80%, 85%, 90%, 95%, 96%, 97%, 98% or 99% of the carbon nanotube surface area over a length of at least 2.5 µm. In some embodiments, the coating covers at least 75%, 80%, 85%, 90%, 95%, 96%, 97%, 98% or 99% of the carbon nanotube surface area over a length of at least 5 µm.

As used herein, the term "about", when used in conjunction with a stated numerical value or range, has the meaning of ±10% of the stated numerical value or range. For example a value of "about 5" would indicate that the value could be from 4.5-5.5. A range of "about 5 to about 10" would indicate that the range could be from 4.5 to 11.

Conformally Coated Carbon Nanotubes

Provided herein are carbon nanotubes conformally coated by diamond nanocrystals or silicon carbide, or a combination of diamond nanocrystals and silicon carbide. Also provided are compositions comprising carbon nanotubes conformally coated by diamond nanocrystals or silicon carbide, or a combination of diamond nanocrystals and silicon carbide. The conformally coated carbon nanotubes can be prepared according to the methods described herein.

The carbon nanotubes can be any carbon nanotubes recognized by those of skill in the art. Generally, carbon nanotubes are cylinders of carbon having diameters of less than 1 µm, less than 0.5 µm or less than 0.2 µm. In certain embodiments, the carbon nanotubes are single-walled (SW-CNTs). Single-walled carbon nanotubes have a single layer of carbon formed into a cylinder. In certain embodiments, the carbon nanotubes are multi-walled (MWCNTs). Multi-walled carbon nanotubes have multiple layers of carbon along the nanotube axis, while single-walled carbon nanotubes have a single layer of carbon along the same axis. In certain embodiments, the carbon nanotubes have a length of at least 1 µm, at least 2 µm, at least 3 µm, at least 4 µm, or at least 5 µm. The carbon nanotubes can be composed of pure carbon, or a mixture of carbon and other elements. In certain embodiments, the carbon nanotubes are composed of at least 90%, 95%, 96%, 97%, 98% or 99% carbon. Additional elements can be selected from the group consisting of nitrogen, boron, oxygen and hydrogen, and combinations thereof.

Advantageously, according to the processes described herein, the conformally coated carbon nanotubes can be prepared under conditions, for instance temperature and pressure conditions, that do not disrupt the structure of the carbon nanotubes. Accordingly, the integrity of the carbon nanotubes can be detected or measured using techniques known to those of skill in the art, such as transmission electron microscopy. Useful techniques for detecting the integrity of the carbon nanotubes include transmission electron microscopy (TEM), scanning electron microscopy (SEM), electron energy loss spectroscopy (EELS) and/or Raman spectroscopy.

In certain embodiments, the coating comprises diamond nanocrystal. In certain embodiments, the coating comprises silicon carbide. In certain embodiments, the coating comprises both silicon carbide and diamond nanocrystal. In particular embodiments, the coating comprises at least 5%, 10%, 20%, 25%, 30%, 40%, 50%, 60%, 70%, 75%, 80%, 85%, 90% or 95% diamond nanocrystal. In particular embodiments, the coating comprises at least 5%, 10%, 20%, 25%, 30%, 40%, 50%, 60%, 70%, 75%, 80%, 85%, 90% or 95% silicon carbide. Amounts of diamond nanocrystal and silicon carbide can be quantified by any technique known to those of skill in the art, for instance, energy dispersive X-ray analysis (EXD). In certain embodiments, the coating comprises at least 10% diamond nanocrystal and at least 10% silicon carbide. In certain embodiments, the coating comprises at least 25% diamond nanocrystal and at least 25% silicon carbide. In certain embodiments, the coating comprises at least 30% diamond nanocrystal and at least 30% silicon carbide. In certain embodiments, the coating comprises at least 40% diamond nanocrystal and at least 40% silicon carbide. In certain embodiments, the coating comprises about 60% diamond crystals and about 40% silicon carbide.

The conformal coating is typically made up of grains. The grains can be composed of diamond nanocrystal, silicon carbide, or both, as described above. Advantageously, the grains can be of small size. In certain embodiments the grains are less than 15 nm in average diameter, less than 12.5 nm in average diameter, or less than 10 nm in average diameter. In certain embodiments, the average size of the grains is between about 2 nm and about 15 nm, between about 2 nm and about 12.5 nm, or between about 2 nm and about 10 nm. The grains, nanocrystalline diamond and silicon carbide can be detected and sized by any technique apparent to those of skill in the art. Examples of such techniques include transmission electron microscopy (TEM), scanning electron microscopy (SEM), electron energy loss spectroscopy (EELS) X-ray diffraction (XRD) and/or Raman spectroscopy.

The carbon nanotubes are conformally coated with the grains described above. In certain embodiments, the grains coat at least 75% of the carbon nanotubes over a length of at least 100 nm. In certain embodiments, the grains coat at least 80% of the carbon nanotubes over a length of at least 100 nm. In certain embodiments, the grains coat at least 85% of the carbon nanotubes over a length of at least 100 nm. In certain embodiments, the grains coat at least 90% of the carbon nanotubes over a length of at least 100 nm. In certain embodiments, the grains coat at least 95% of the carbon nanotubes over a length of at least 100 nm. In certain embodiments, the grains coat at least 96% of the carbon nanotubes over a length of at least 100 nm. In certain embodiments, the grains coat at least 97% of the carbon nanotubes over a length of at least 100 nm. In certain embodiments, the grains coat at least 98% of the carbon nanotubes over a length of at least 100 nm. In certain embodiments, the grains coat at least 99% of the carbon nanotubes over a length of at least 100 nm.

In certain embodiments, the grains coat at least 75% of the carbon nanotubes over a length of at least 250 nm. In certain embodiments, the grains coat at least 80% of the carbon nanotubes over a length of at least 250 nm. In certain embodiments, the grains coat at least 85% of the carbon nanotubes over a length of at least 250 nm. In certain embodiments, the grains coat at least 90% of the carbon nanotubes over a length of at least 250 nm. In certain embodiments, the grains coat at least 95% of the carbon nanotubes over a length of at least 250 nm. In certain embodiments, the grains coat at least 96% of the carbon nanotubes over a length of at least 250 nm. In certain embodiments, the grains coat at least 97% of the carbon nanotubes over a length of at least 250 nm. In certain embodiments, the grains coat at least 98% of the carbon nanotubes over a length of at least 250 nm. In certain embodiments, the grains coat at least 99% of the carbon nanotubes over a length of at least 250 nm.

In certain embodiments, the grains coat at least 75% of the carbon nanotubes over a length of at least 500 nm. In certain embodiments, the grains coat at least 80% of the carbon nanotubes over a length of at least 500 nm. In certain embodiments, the grains coat at least 85% of the carbon nanotubes over a length of at least 500 nm. In certain embodiments, the grains coat at least 90% of the carbon nanotubes over a length of at least 500 nm. In certain embodiments, the grains coat at least 95% of the carbon nanotubes over a length of at least 500 nm. In certain embodiments, the grains coat at least 96% of the carbon nanotubes over a length of at least 500 nm. In certain embodiments, the grains coat at least 97% of the carbon nanotubes over a length of at least 500 nm. In certain embodiments, the grains coat at least 98% of the carbon nanotubes over a length of at least 500 nm. In certain embodiments, the grains coat at least 99% of the carbon nanotubes over a length of at least 500 nm.

In certain embodiments, the grains coat at least 75% of the carbon nanotubes over a length of at least 1 µm. In certain embodiments, the grains coat at least 80% of the carbon nanotubes over a length of at least 1 µm. In certain embodiments, the grains coat at least 85% of the carbon nanotubes over a length of at least 1 µm. In certain embodiments, the grains coat at least 90% of the carbon nanotubes over a length of at least 1 µm. In certain embodiments, the grains coat at least 95% of the carbon nanotubes over a length of at least 1 µm. In certain embodiments, the grains coat at least 96% of the carbon nanotubes over a length of at least 1 µm. In certain embodiments, the grains coat at least 97% of the carbon nanotubes over a length of at least 1 µm. In certain embodiments, the grains coat at least 98% of the carbon nanotubes over a length of at least 1 µm. In certain embodiments, the grains coat at least 99% of the carbon nanotubes over a length of at least 1 µm.

In certain embodiments, the grains coat at least 75% of the carbon nanotubes over a length of at least 2.5 µm. In certain embodiments, the grains coat at least 80% of the carbon nanotubes over a length of at least 2.5 µm. In certain embodiments, the grains coat at least 85% of the carbon nanotubes over a length of at least 2.5 µm. In certain embodiments, the grains coat at least 90% of the carbon nanotubes over a length of at least 2.5 µm. In certain embodiments, the grains coat at least 95% of the carbon nanotubes over a length of at least 2.5 µm. In certain embodiments, the grains coat at least 96% of the carbon nanotubes over a length of at least 2.5 µm. In certain embodiments, the grains coat at least 97% of the carbon nanotubes over a length of at least 2.5 µm. In certain embodiments, the grains coat at least 98% of the carbon nanotubes over a length of at least 2.5 µm. In certain embodiments, the grains coat at least 99% of the carbon nanotubes over a length of at least 2.5 µm.

In certain embodiments, the grains coat at least 75% of the carbon nanotubes over a length of at least 5 µm. In certain embodiments, the grains coat at least 80% of the carbon nanotubes over a length of at least 5 µm. In certain embodiments, the grains coat at least 85% of the carbon nanotubes over a length of at least 5 µm. In certain embodiments, the grains coat at least 90% of the carbon nanotubes over a length of at least 5 µm. In certain embodiments, the grains coat at least 95% of the carbon nanotubes over a length of at least 5 µm. In certain embodiments, the grains coat at least 96% of the carbon nanotubes over a length of at least 5 µm. In certain embodiments, the grains coat at least 97% of the carbon nanotubes over a length of at least 5 µm. In certain embodiments, the grains coat at least 98% of the carbon nanotubes over a length of at least 5 µm. In certain embodiments, the grains coat at least 99% of the carbon nanotubes over a length of at least 5 µm.

One advantage of the methods provided in this disclosure is that the integrity of the carbon nanotubes is preserved during coating with NCD and/or SiC. In certain embodiments, the integrity of the carbon nanotubes may be quantified by evaluating their presence after coating. For example, in some embodiments at least about 60% of the carbon nanotubes used as starting materials are present after coating. In some embodiments, at least about 70% of the carbon nanotubes used as starting materials are present after coating. In some embodiments, at least about 80% of the carbon nanotubes used as starting materials are present after coating. In some embodiments, at least about 90% of the carbon nanotubes used as starting materials are present after coating. In some embodiments, at least about 95% of the carbon nanotubes used as starting materials are present after coating.

The carbon nanotubes can take on any form of carbon nanotubes known to those of skill in the art. In certain embodiments, the carbon nanotubes are single-walled tubes. In certain embodiments, the carbon nanotubes are multiple walled tubes. In certain embodiments, the carbon nanotubes include both single and multiple walled tubes. In certain embodiments, the carbon nanotubes are isolated multiple walled tubes or bundles of tubes. In certain embodiments, the carbon nanotubes are isolated single walled tubes or bundles of tubes.

In certain embodiments, the carbon nanotubes are in contact with a substrate. Useful substrates include copper, silicon, molybdenum and polymers. In certain embodiments, the substrate may be a part of a device structure. In certain embodiments, the carbon nanotubes are randomly dispersed on a substrate. In certain embodiments, the carbon nanotubes are distributed in a predetermined pattern. In certain embodiments, the carbon nanotubes are pre-dispersed on the surface of a substrate. In certain embodiments, the carbon nanotubes are previously grown on the substrate. In certain embodiments, the carbon nanotubes are dispersed within a substrate.

Also provided herein are materials comprising carbon nanotubes coated by small diamond nanocrystals, for example, sub-10 nm diamond nanocrystals. In certain embodiments, these materials can be prepared by the carburization methods described herein. By contacting carbon nanotubes with methane in hydrogen gas, the carbon nanotubes can be coated with small diamond nanocrystal grains. Such grains can have a variety of sizes, as described throughout this disclosure. In certain embodiments the grains are less than 15 nm in average diameter, less than 12.5 nm in average diameter, less than 10 nm in average diameter, or less than 8 nm in average diameter. In certain embodiments, the average size of the grains is between about 2 nm and about 15 nm, between about 2 nm and about 12.5 nm, or between about 2 nm and about 10 nm. Advantageously, these materials can be made by the method of providing a substrate, dispersing or growing CNTs on the surface of the substrate, and exposing the substrate to HFCVD with methane ($CH_4$) in hydrogen as the feeding gas for a sufficient time to coat the CNTs by diamond nanocrystals at low CNT and substrate temperature. The low temperatures are less than 360° C., for instance about 80° C. The time can be 30 minutes or more, 60 minutes or more, or 120 minutes or more.

Preparation of Conformally Coated Carbon Nanotubes

The conformally coated carbon nanotubes can be made advantageously by the following methods that can be carried out at low temperature and/or low pressure. These mild conditions can preserve the integrity of the carbon nanotubes throughout the process, so that the resulting conformally coated carbon nanotubes maintain some or substantially all of the structure of the carbon nanotube. At higher temperature or pressure, as in certain conventional methods, the carbon nanotube might not survive the coating process. As described above, the integrity of the carbon nanotubes can be detected, measured or quantified according to techniques known to those of skill in the art.

Carbon nanotubes can be obtained or prepared according to any technique apparent to those of skill in the art. Useful processes include those described in, for example, Baker & Harris, 1978, *Chemistry and Physics of Carbon*, Walker and Thrower ed., 14:83; Rodriguez, 1993, *Journal of Materials Research.* 8:3233; Oberlin et al., 1976, *Journal of Crystal Growth*, 32:335-349; U.S. Pat. No. 4,663,230; U.S. Pat. No. 5,171,560; Iijima, 1991, *Nature* 354:56; Weaver, 1994, *Science* 265; de Heer, Walt, 2004, *MRS Bulletin*, "Nanotubes and the Pursuit of Applications"; Iijima & Ichihashi, 1993, *Nature*, 363:603; Bethune et al., 1993, *Nature* 363:605; U.S. Pat. No. 5,424,054; Guo et al., 1995, *Chemical Physics Letters* 243:1-12; Thess et al., 1996, *Science* 273:483-487; Dai et al., 1996, *Chemical Physics Letters* 260:471-475; U.S. Pat. No. 6,761,870 and international patent publication no. WO 00/26138; Kitiyanan et al., 2000, *Chemical Physics Letters* 317:497-503; U.S. Pat. No. 6,333,016. All of these references are hereby incorporated by reference in their entirety For conformal coating, the carbon nanotubes are grown on or placed on a substrate. Useful substrates include copper substrates, silicon substrates, molybdenum substrates, polymer substrates, or a substrate that is part of a device structure. The substrate can be in any form. In exemplary embodiments, the substrate is a 1 $cm^2$ square silicon substrate. In other exemplary embodiments, the substrate is a 14 mm diameter copper disk. The carbon nanotubes can be dispersed on the substrate in any manner apparent to one of skill in the art. They can be randomly dispersed on the substrate. They can be dispersed on the substrate in a pre-arranged pattern. They can be arranged on the substrate as individual nanotubes. They can be arranged on the substrate as bundles of nanotubes. In certain embodiments, the carbon nanotubes can be grown directly on the substrate. In certain embodiments, the carbon nanotubes can be grown and then placed in contact with the substrate. In certain embodiments, the carbon nanotubes are on the surface of the substrate. In certain embodiments, the carbon nanotubes are integrated into the substrate.

The substrate, in contact with the carbon nanotubes is placed within a chemical vapor deposition chamber. The chemical vapor deposition chamber can be any chemical vapor deposition chamber known to those of skill in the art. Generally, a chemical vapor deposition chamber comprises a vacuum chamber, a substrate support and a feed gas inlet. In certain embodiments, the chemical vapor deposition chamber is a hot-filament chemical vapor deposition chamber. Generally, a hot-filament chemical vapor deposition chamber comprises a vacuum chamber, a substrate support, a feed gas inlet and a filament support. The particular hot-filament chemical vapor deposition apparatus is not critical. Useful chemical vapor deposition chambers include the BWI 1000 model hot filament chemical vapor deposition chamber (Blue Wave Semiconductors).

Within the chemical vapor deposition chamber, any filament or combination of filaments deemed useful can be used by the practitioner of skill. In certain embodiments, the filament is selected from the group consisting of tungsten, rhenium, tantalum and platinum, and combinations thereof. In particular embodiments, the filament is a tungsten wire.

One or more atomic coating sources are also placed within the chemical vapor deposition chamber. In certain embodiments, the source is a carbon source. In certain embodiments, the source is a silicon source. In further embodiments, both carbon and silicon sources are used.

Other useful sources include boron and boron nitride. In particular embodiments, the source can be a graphite holder for the substrate. In particular embodiments, the silicon source can be silicon-based vacuum grease used to seal the chemical vapor deposition chamber. In further embodiments, both a graphite substrate holder and silicon-based vacuum grease are used as sources.

In particularly useful embodiments, one or more of the sources are etched by hydrogen radicals. In certain embodiments, the carbon source is etched by hydrogen radicals. In certain embodiments, the silicon source is etched by hydrogen radicals. In further embodiments, both the carbon source and the silicon source are etched by hydrogen radicals.

Those of skill in the art will recognize that the growth of diamond and SiC from a solid source can be more effective than that from gas source. In the case of diamond formation, this can be due to higher production of hydrocarbon radicals and a higher proportion of hydrocarbon radicals taking part in diamond growth when a solid source is used instead of a gas source. In conventional HFCVD, hydrocarbon radicals are formed only when hydrocarbon molecules have passed over the filament or reacted with atomic hydrogen. In that process, only a small fraction of the radicals are deposited in the form of diamond, because of the long-range transport required in the gas phase and the short half-life of the radicals participating in the diamond formation process. On the other hand, in solid carbon source methods, the reaction products produced by atomic hydrogen and graphite are predominantly hydrocarbon radicals, and a high fraction of these radicals contribute to diamond growth. The effective production of hydrocarbon radicals from graphite etching can be best used for diamond growth when the Attorney Docket No. 110229.00003 graphite source is close to the substrate. A higher concentration of hydrocarbon radicals usually results in a higher diamond growth rate and higher second nucleation rates of diamond, which has been confirmed by placing the substrate closer to the filament in conventional HFCVD processes. Similarly higher concentrations of hydrocarbon and silicon radicals can result in higher silicon carbide growth rates.

In the process, the temperature of the substrate is controlled. In certain embodiments, the temperature of the substrate is less than about 360° C. In certain embodiments, the temperature of the substrate is less than about 300° C. In certain embodiments, the temperature of the substrate is less than about 250° C. In certain embodiments, the temperature of the substrate is less than about 200° C. In certain embodiments, the temperature of the substrate is between about 80 and about 360° C. In certain embodiments, the temperature of the substrate is between about 80 and about 250° C. In certain embodiments, the temperature of the substrate is between about 80 and about 200° C. In certain embodiments, the temperature of the substrate is between about 150 and about 200° C. In certain embodiments, the temperature of the substrate is between about 170 and about 200° C. In certain embodiments, the substrate temperature is about 190° C. In certain embodiments, the substrate temperature is about 180° C. In certain embodiments, the substrate temperature is about 200° C.

In the process, the temperature of the carbon nanotubes is controlled. In certain embodiments, the temperature of the carbon nanotubes is less than about 360° C. In certain embodiments, the temperature of the carbon nanotubes is less than about 300° C. In certain embodiments, the temperature of the carbon nanotubes is less than about 250° C. In certain embodiments, the temperature of the carbon nanotubes is less than about 200° C. In certain embodiments, the temperature of the carbon nanotubes is between about 80 and about 360° C. In certain embodiments, the temperature of the carbon nanotubes is between about 80 and about 250° C. In certain embodiments, the temperature of the carbon nanotubes is between about 80 and about 200° C. In certain embodiments, the temperature of the carbon nanotubes is between about 150 and about 200° C. In certain embodiments, the temperature of the carbon nanotubes is between about 170 and about 200° C. In certain embodiments, the carbon nanotubes temperature is about 190° C. In certain embodiments, the carbon nanotubes temperature is about 180° C. In certain embodiments, the carbon nanotubes temperature is about 200° C.

In the process, the one or more filaments are at a temperature deemed useful by the practitioner of skill in the art. In certain embodiments, the filament temperature is greater than about 1800° C., greater than about 1900° C., greater than about 2000° C., greater than about 2100° C., greater than about 2200° C., greater than about 2300° C., greater than about 2400° C., or greater than about 2500° C.

In the process, a feed gas is flowed over the substrate, under vacuum, at the temperatures and conditions described above. The feed gas can be a single feed gas, or multiple feed gases can be used. Useful feed gases include hydrogen and a mixture of hydrogen with other gas such as $N_2$, $H_2S$, $CS_2$, $NH_4$, $B_3N_3H_6$, $B_2H_6$, $CH_4$, $C_2H_2$, Ar, He and combinations thereof. In particular embodiment, the sole feed gas is hydrogen.

The feed gas can be flowed over the substrate at any pressure and flow rate deemed suitable by the practitioner of skill in the art. In certain embodiments, the feed gas is flowed at a pressure of less than about 150 Torr, at a pressure of less than about 125 Torr or at a pressure of less than about 100 Torr. In certain embodiments, the feed gas is flowed at a pressure of between about 5 and about 150 Torr between about 5 and about 125 Torr, or between about 5 and about 100 Torr. In certain embodiments, the flow rate is less than about 250 standard cubic centimeters per minute (sccm), less than about 200 sccm, less than about 150 sccm, less than about 100 sccm, less than about 75 sccm, less than about 50 sccm, less than about 25 sccm. In certain embodiments, the flow rate is about 100 sccm. In certain embodiments the flow rate is between about 1 and about 100 sccm.

The feed gas flow should be maintained for a sufficient length of time to achieve conformal coating of the carbon nanotubes. In certain embodiments, the flow is maintained for at least about 1, 2, 3, 4, 5, 6, 7, 8, 9, 10, 15, 20, 25, or more hours.

Formation of conformally coated nanotubes can be detected by techniques known to those of skill in the art. In particular embodiments, conformally carbon nanotubes can be detected by electron microscopy, for example scanning electron microscopy (SEM) or transmission electron microscopy (TEM).

Uses and Applications

The conformally coated carbon nanotubes can be used for any application apparent to those of skill in the art, without limitation. In certain embodiments, provided herein are films comprising the conformally carbon nanotubes. In certain embodiments, provided herein are coatings comprising the conformally coated carbon nanotubes. Advantageously, the compositions and methods provided herein can be used to coat materials that would otherwise be too temperature-sensitive and/or too pressure-sensitive to be coated by conventional techniques. In certain embodiments, provided herein are polymeric materials coated with the conformally coated carbon nanotubes. In certain embodiments, provided herein are semiconductor materials coated with the conformally coated carbon nanotubes. In certain embodiments, provided herein are composite materials comprising the conformally coated carbon nanotubes. In certain embodiments, provided herein are field emission devices comprising the conformally coated carbon nanotubes. In certain embodiments, provided herein are electronic devices comprising the conformally coated carbon nanotubes. In certain embodiments, provided herein are micro-electro-mechanical systems comprising the conformally coated carbon nanotubes. In certain embodiments, provided herein are nano-electro-mechanical systems comprising the conformally coated carbon nanotubes. In certain embodiments, provided herein are biodevices comprising the conformally coated carbon nanotubes. In certain embodiments, provided herein are wear-resistant coatings comprising the conformally coated carbon nanotubes. In certain embodiments, provided herein are integrated circuits comprising the conformally coated carbon nanotubes. In certain embodiments, provided herein are electrical field shields comprising the conformally coated carbon nanotubes. In certain embodiments, provided herein are sensors comprising the conformally coated carbon nanotubes.

EXAMPLES

Example 1

Silicon substrates (100) were cleaned in acetone, rinsed in deionized water and dried in nitrogen at room temperature. The substrates were then immersed in a solution of isopropanol containing MWCNTs. After 30 minutes, they were removed from the solution and dried in a chemical hood under atmospheric conditions. No effort was made to achieve high MWCNTs dispersion. Other dispersion methods can be used to coat larger quantities of CNTs.

A commercial HFCVD system from Blue Wave Semiconductors (BWI 1000 model) was used for synthesis (FIG. 1). The reactor is a six-way cross stainless steel vacuum chamber. It is fluid cooled (15% water, 75% glycol at 18° C.) with brazed copper tubing covered with an aluminum foil. The reactor is equipped with a molybdenum filament cartridge that accommodates one to three 0.5 mm diameter straight tungsten wires. Typically two 5.7 cm length wires, 1 cm apart, are used. Substrates were placed on the movable and fluid-cooled 5 cm diameter sample stage. On the sample stage were placed successively a boron nitride (BN) plate, a molybdenum holder and a high-purity graphite plate (from Alfa Aesar), on top of which was placed the substrate. A new graphite plate was used for each synthesis. High vacuum grease (from Dow Corning) was used to maintain the substrate fixed on the graphite plate. The substrate and the silicon grease serve as a silicon solid source.

The substrate temperature was estimated by a thermocouple located just below the surface of the molybdenum holder. A hole was drilled on the side of the molybdenum holder reaching the center of the holder. The thermocouple tip was inserted into the hole. The temperature was calibrated using melting points of known polymers. Before synthesis, the HFCVD system was evacuated to below $4 \times 10^{-4}$ mbar using a turbomolecular pump backed with a hydrocarbon oil pump.

Gases were introduced into the chamber via a stainless steel tube located on top of the chamber. Gas flow was regulated by Omega mass flow controllers. The pressure, P, was regulated via an automatic valve located below the substrate holder. The filament temperature, $T_F$, was monitored with a two color pyrometer (M90R2 model from Mikron Infrared, Inc.). Before synthesis, the filament was carburized for 30 min in a mixture of 10% of $CH_4$ in ultra high purity (UHP) $H_2$. The pressure and gas flow were 10 Torr (13.3 mbar) and 50 sccm, respectively. The distance between the substrate holder and the filaments, d, was 41.6 mm. The current for both filaments, was kept constant, at 47 A. $T_F$ was found to increase from 2000 to 2410° C. during the first 26 min and then remained constant.

After 30 min of carburization, the substrate temperature reached approximately 81° C. For synthesis, UHP $H_2$ was the only gas introduced into the chamber. The pressure and flow were 10 Torr and 100 sccm, respectively. The filament current was raised and maintained at 55 A, which resulted in a filament temperature of 2550° C. The distance d was decreased to 9.8 mm. The resulting substrate temperature was of about 190° C. The duration of the synthesis was 8 hours.

The surface morphology was investigated by scanning electron microscopy, SEM, using a JEOL JSM-7500F field emission SEM. For the analysis of the composite structure, transmission electron microscopy (TEM), energy dispersive X-ray analysis (EDX), electron energy loss spectroscopy (EELS) and selected area electron diffraction (SAED) were performed using an energy filtered LEO-922 OMEGA microscope equipped with an Omega filter and EDAX Genesis 2000 microanalysis system (accelerating voltage of 200 kV). For this purpose, 3 nm thick holly carbon coated Cu grids were prepared by scratching the samples with a commercial diamond tip. Raman spectroscopy was also used to analyze the structure. The spectra were recorded with a triple monochromator (ISA J-Y Model T64000) using the 514.5 nm line of Ar laser and a ×80 objective. The probed area was about 2 µm². A Renishaw InVia Reflex Spectrometer System with a stigmatic single pass spectrograph was also used for Raman analysis. In this case, the 488 nm line of an Ar ion laser and a ×50 objective were used. The laser power on the sample, and acquisition time were adjusted to obtain optimum signal without any sample modification. No visible damage and no change of the spectral shape during measurements were observed. Silicon was used to calibrate the peak position.

Figures 2A, 2B:
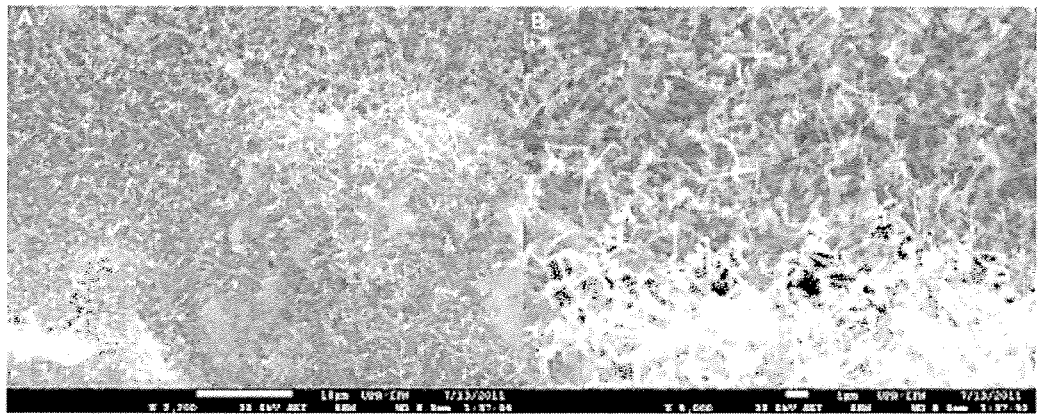
FIG. 2A provides a scanning electron microscope (SEM) micrograph showing CNTs conformally coated by diamond nano-crystals and SiC at low CNT and substrate temperature.
FIG. 2B provides an SEM micrograph showing CNTs conformally coated by diamond nano-crystals and SiC at low CNT and substrate temperature.
Figures 2C, 2D:
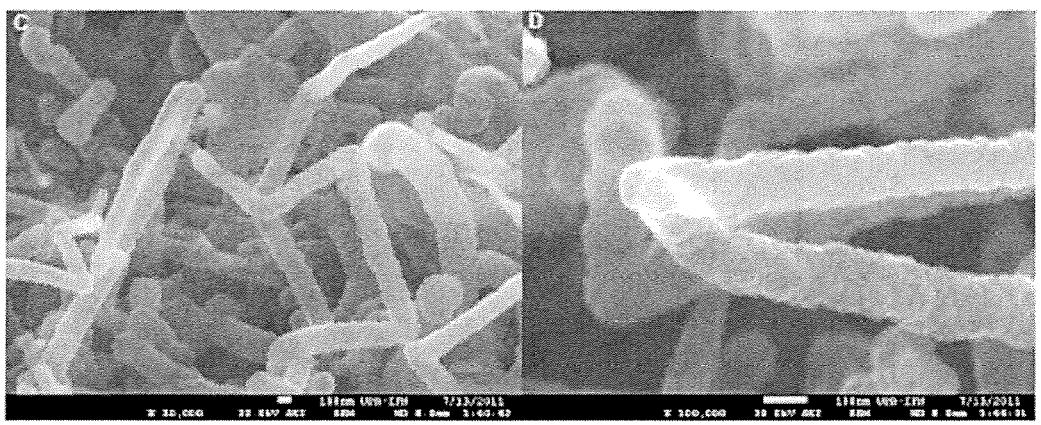
FIG. 2C provides an SEM micrograph showing CNTs conformally coated by diamond nano-crystals and SiC at low CNT and substrate temperature.
FIG. 2D provides an SEM micrograph showing CNTs conformally coated by diamond nano-crystals and SiC at low CNT and substrate temperature.
Figure 2E:
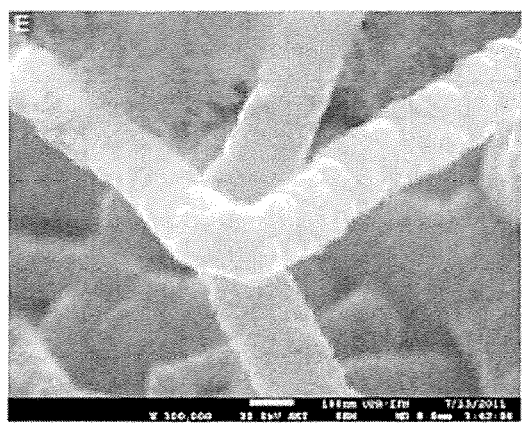
FIG. 2E provides an SEM micrograph showing CNTs conformally coated by diamond nano-crystals and SiC at low CNT and substrate temperature.

FIG. 2 shows SEM micrographs of about 100 to about 200 nm diameter nanowires obtained from MWCNTs dispersed on a silicon substrate and exposed to 100 sccm $H_2$ flux in the presence of a solid carbon and a solid silicon source (P=10 Torr; d=9.8 mm; $T_F$=2541° C.; duration: 8 hours) for diamond and SiC synthesis. Before synthesis, the sample was exposed to a carburization process. Nanowire length can be greater than 1 µm. The surface of these nanowires exhibits a highly conformal coating of sub-10 nm diameter nanometer grains (FIG. 2C-E).

FIG. 3 presents TEM images of such nanowires. The dimensions of the nanowires observed under TEM is consistent with the dimensions of the nanowires observed under SEM. An extensive TEM investigation showed that the nanowires observed under SEM and under TEM are of the same nature. FIG. 3A-D reveal 100 nm diameter MWCNTs covered by faceted grains. FIG. 3E-H shows 150 nm diameter and 1 µm length nanowires. Magnified TEM images reveal lattice fringes of nanocrystals of different orientation on the surface of the nanowires (FIG. 3F-H). The d-spacing (spacing between adjacent lattice planes) value estimated from FIG. 3G and from 7 planes (white arrow) is of 2.06 Å, as compared to the theoretical value of 2.059 Å, corresponding to diamond <111> lattice spacing. Therefore the TEM images show the presence of MWCNTs with a conformal coating of sub 10-nm grains, some of them being diamond nanocrystals.

Figure 4:
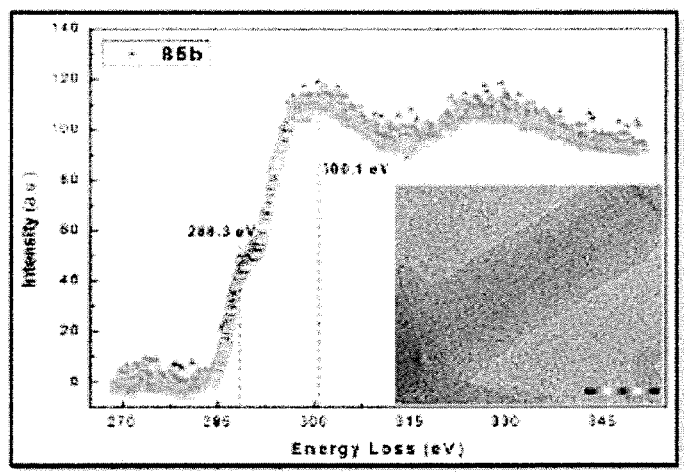
FIG. 4 provides a carbon K edge spectrum of CNTs conformally coated by diamond nano-crystals and SiC at low CNT and substrate temperature.

Carbon K edge EELS spectra obtained from coated MWCNTs (FIG. 4) are similar to EELS and NEXAFS spectra of nanocrystalline diamond (NCD) thin films. The peak at about 284 eV, from C1s-$\pi$* transitions in C-$sp^2$, is not well defined and not well separated from the band centered at about 299 eV, from C1s-$\sigma$* transitions in C-$sp^3$ and in C-$sp^2$, even though the spectra include the contribution from the Holly carbon grid and from MWCNTs. The characteristics of the C1s-$\pi$* band suggest that a $sp^3$-rich material covers MWCNTs. The trough at about 312 eV is interpreted as the second band-gap of diamond. These results strongly indicate that the coating on the surface of MWCNTs is made of a nanocrystalline diamond surface.

Figure 7:
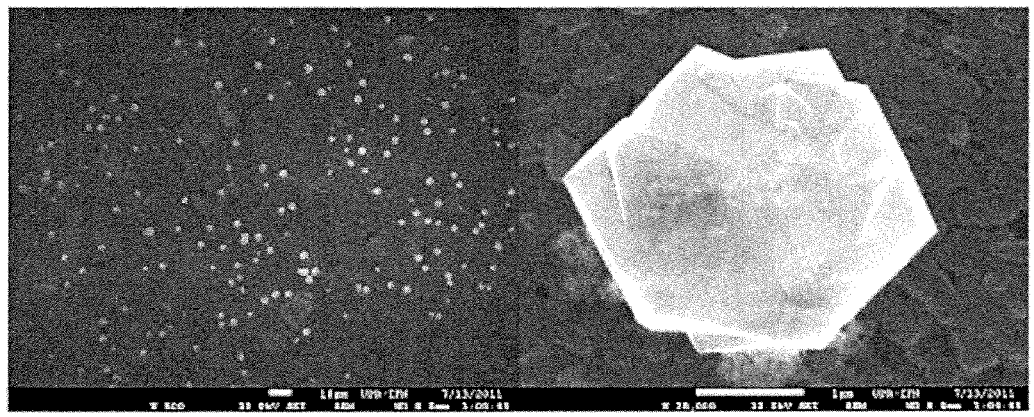
FIG. 7 provides SEM micrographs, at different magnifications, of a substrate region free of MWCNTs and exposed to the same conditions leading to the coating of MWCNTs by diamond nanocrystals and SiC at low CNT temperature. Diamond micro-crystals are observed.
Figure 8:
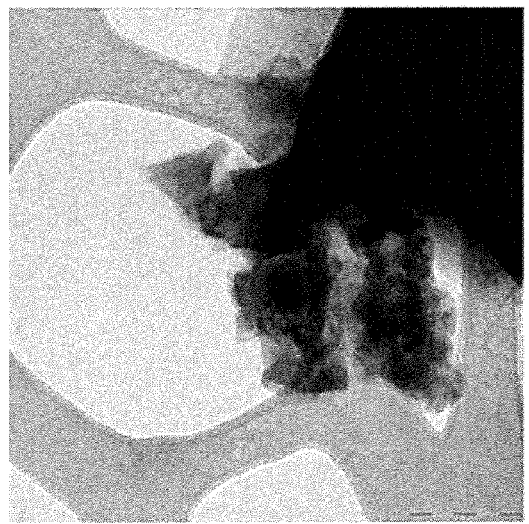
FIG. 8 provides a TEM image showing faceted diamond nano-crystals obtained from the substrate exposed to the process used to coat CNTs by nano-crystalline diamond and SiC.
Figures 9A, 9B:
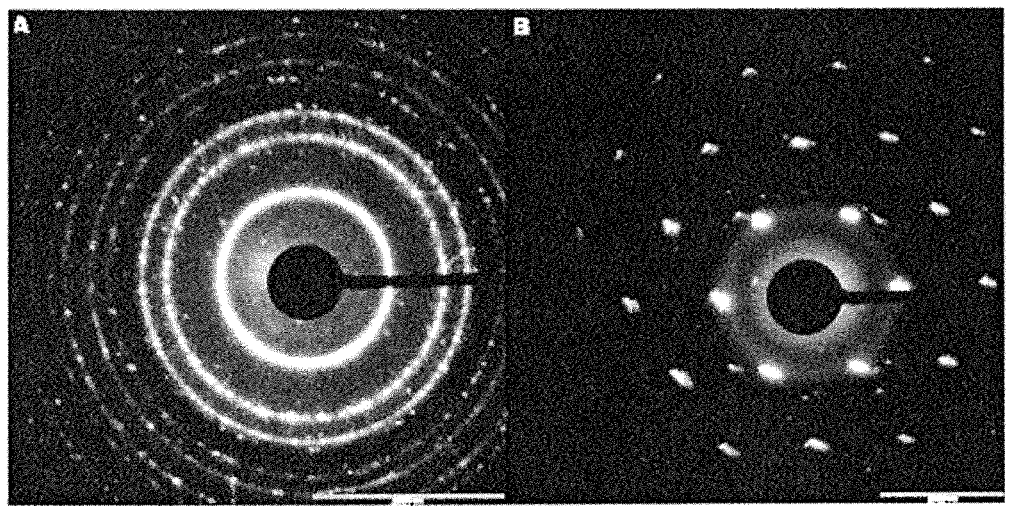
FIG. 9A provides electron diffraction patterns characteristic of diamond obtained from a substrate exposed to a process used to coat CNTs by nano-crystalline diamond and SiC.
FIG. 9B provides electron diffraction patterns characteristic of diamond obtained from a substrate exposed to a process used to coat CNTs by nano-crystalline diamond and SiC.
Figure 10:
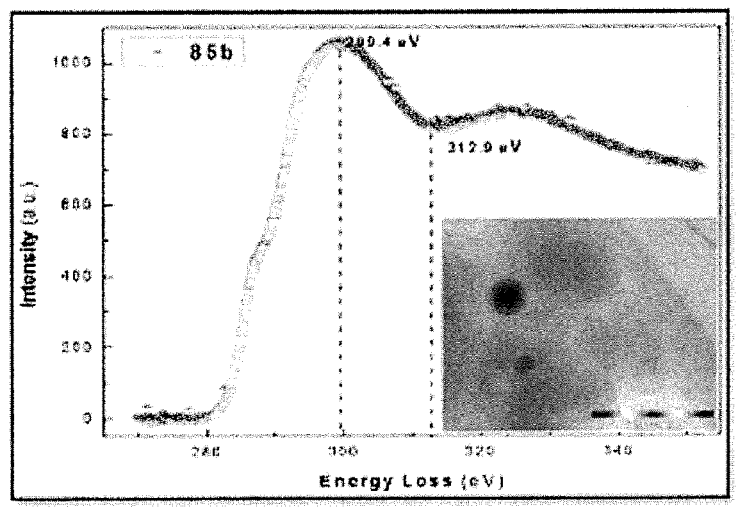
FIG. 10 provides a carbon K edge spectrum corresponding to substrate regions such as those observed in FIG. 8.
Figure 11:
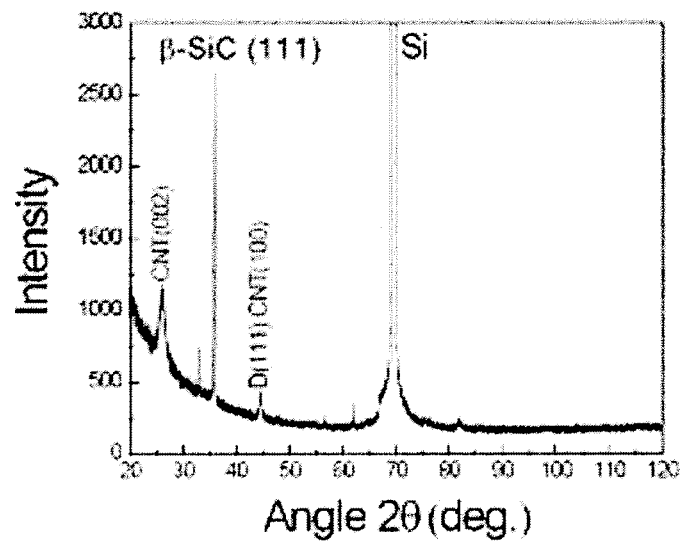
FIG. 11 provides an X-ray diffraction pattern of a silicon substrate surface onto which were dispersed MWCNTs, which were subsequently exposed to the low temperature process leading to MWCNTs conformally coated by diamond nanocrystals and SiC.

Other data also indicate the presence of diamond microcrystals in the samples. For example, the SEM images of FIG. 7 show that diamond microcrystals are observed in regions of the substrate free of MWCNTs. Similarly, the TEM images of FIG. 8 shows thick agglomerates of faceted crystals. Some of these crystals exhibit triangular or square shapes, indicative of diamond nanocrystals. Additionally, the electron diffraction patterns observed from the substrate are characteristic of diamond (FIG. 9). FIG. 9A shows the diffraction ring of the (111), (220) and (311) diamond planes. In other regions of the substrate, the characteristic pattern of monocrystalline diamond is observed (FIG. 9B). Analysis of agglomerates, such as those shown in FIG. 8, by EELS spectroscopy generated spectra similar to typical EELS and NEXAFS spectra for NCD (FIG. 10). Finally, XRD diffractograms show a diamond (111) diffraction peak (FIG. 11).

Figures 3A, 3B:
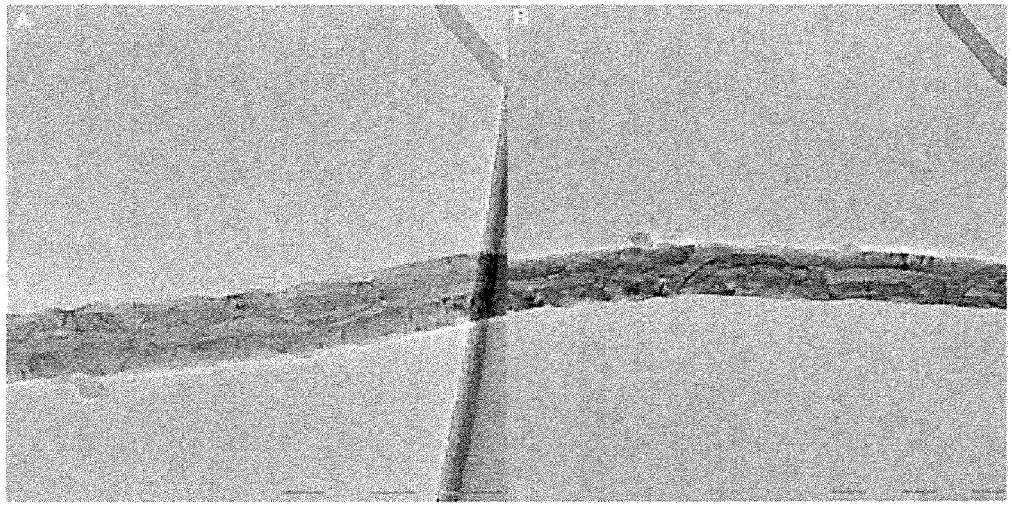
FIG. 3A provides a transmission electron microscope (TEM) image of CNTs conformally coated by diamond nano-crystals and SiC at low CNT and substrate temperature according to the present invention. Faceted grains are visible on the surface of the CNTs. The walls of the multi-walled carbon nanotubes (MWCNTs) are observed showing that the structure of MWCNTs is preserved during the coating process of CNTs.
FIG. 3B provides a TEM image of CNTs conformally coated by diamond nano-crystals and SiC at low CNT and substrate temperature according to the present invention. Faceted grains are visible on the surface of the CNTs. The walls of the multi-walled carbon nanotubes (MWCNTs) are observed showing that the structure of MWCNTs is preserved during the coating process of CNTs.
Figures 3C, 3D:
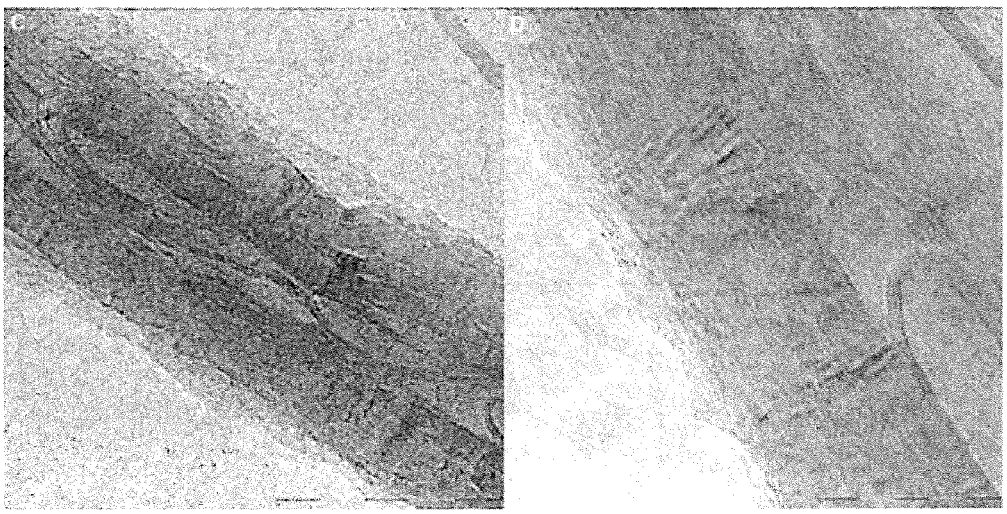
FIG. 3C provides a TEM image of CNTs conformally coated by diamond nano-crystals and SiC at low CNT and substrate temperature according to the present invention. Faceted grains are visible on the surface of the CNTs. The walls of the multi-walled carbon nanotubes (MWCNTs) are observed showing that the structure of MWCNTs is preserved during the coating process of CNTs.
FIG. 3D provides a TEM image of CNTs conformally coated by diamond nano-crystals and SiC at low CNT and substrate temperature according to the present invention. Faceted grains are visible on the surface of the CNTs. The walls of the multi-walled carbon nanotubes (MWCNTs) are observed showing that the structure of MWCNTs is preserved during the coating process of CNTs.
Figures 3E, 3F:
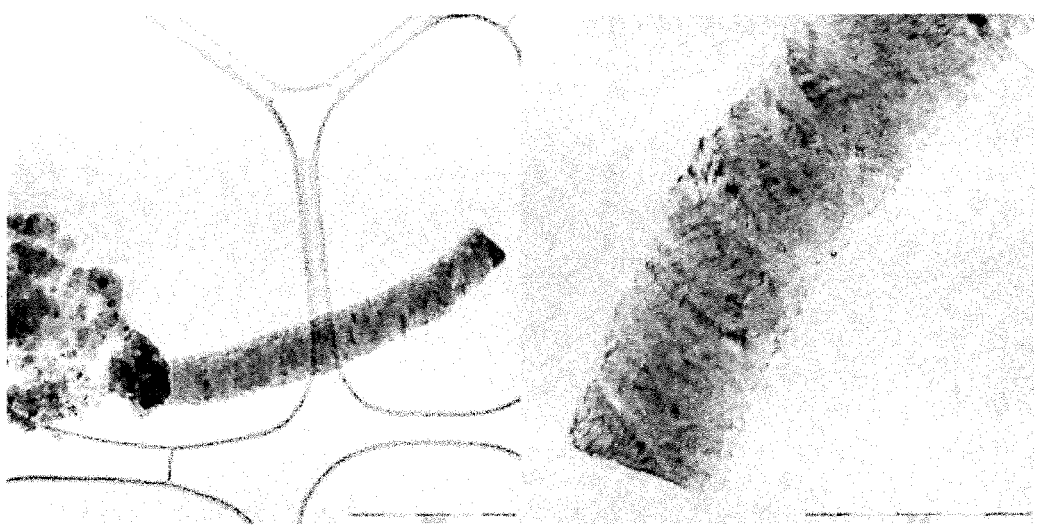
FIG. 3E provides a TEM image of CNTs conformally coated by diamond nano-crystals and SiC at low CNT and substrate temperature according to the present invention. Diamond lattice fringes are observed on the surface of the tubes.
FIG. 3F provides a TEM image of CNTs conformally coated by diamond nano-crystals and SiC at low CNT and substrate temperature according to the present invention. Diamond lattice fringes are observed on the surface of the tubes.
Figures 3G, 3H:
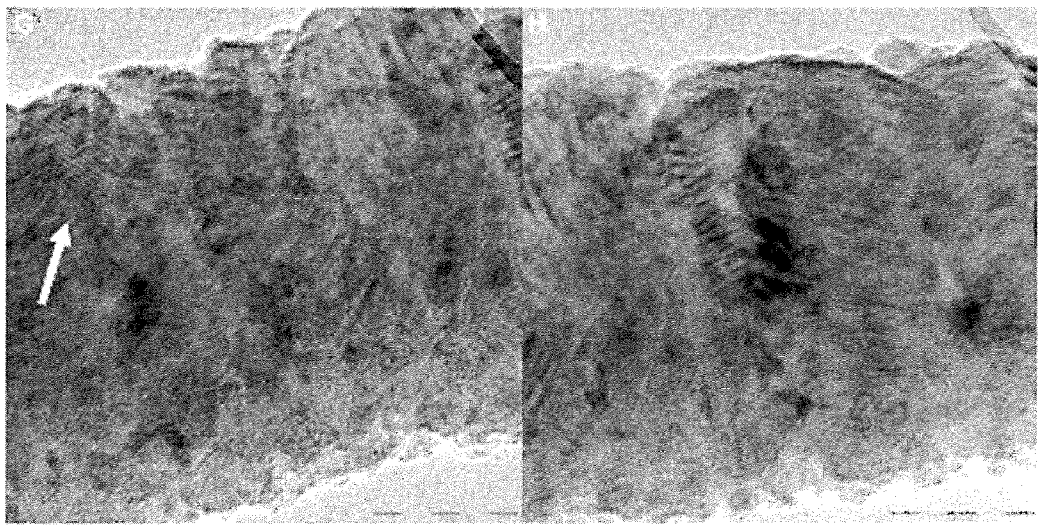
FIG. 3G provides a TEM image of CNTs conformally coated by diamond nano-crystals and SiC at low CNT and substrate temperature according to the present invention. Diamond lattice fringes (white arrow) are observed on the surface of the tubes.
FIG. 3H provides a TEM image of CNTs conformally coated by diamond nano-crystals and SiC at low CNT and substrate temperature according to the present invention. Diamond lattice fringes are observed on the surface of the tubes.
Figures 5A, 5B:
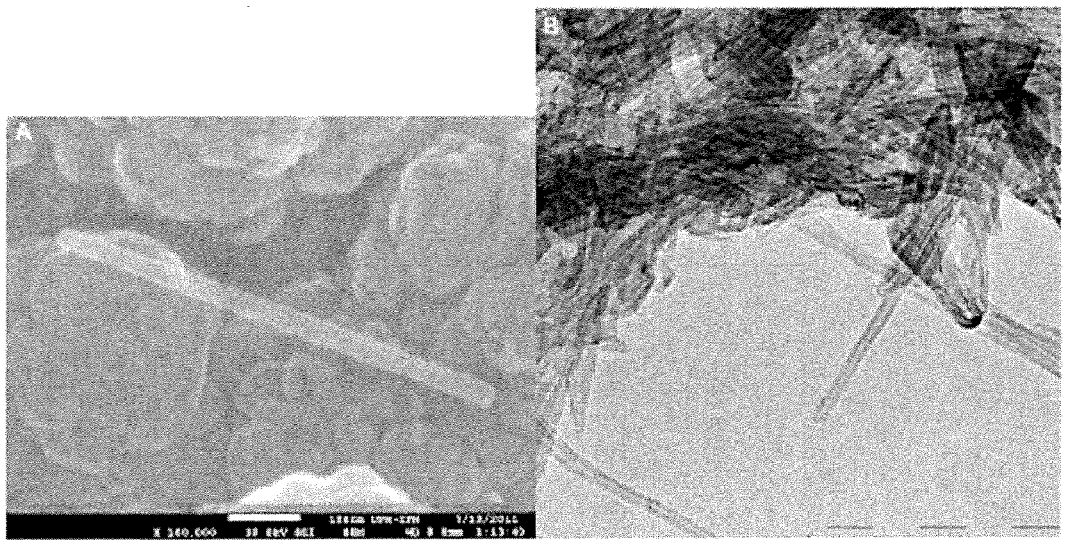
FIG. 5A provides an SEM micrograph showing that CNTs survive the process of coating with diamond nanocrystals and SiC.
FIG. 5B provides a TEM image showing that CNTs survive the process of coating with diamond nanocrystals and SiC.
Figure 6A:
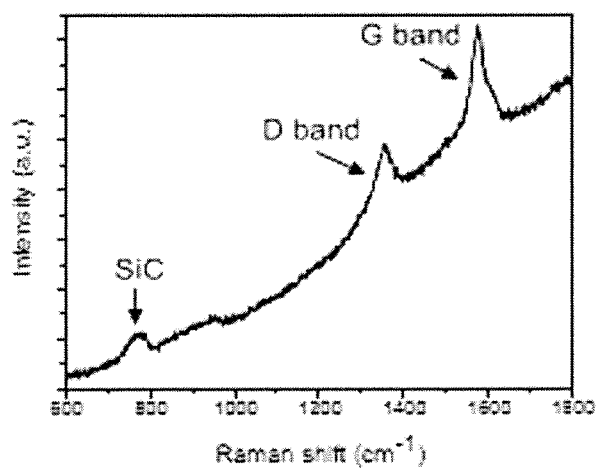
FIG. 6A provides exemplary Raman spectra of a region of a substrate where MWCNTs are conformally coated by diamond nanocrystals and SiC.

Various results show that MWCNTs are not destroyed during the synthesis process, that they maintain their structure and that the nanowires covered by diamond nanocrystals have MWCNTs in their center. FIG. 5A (SEM) and FIG. 5B (TEM) show that uncoated, but intact MWCNTs are observed after performing the coating process. Additionally, in some TEM images, faceted crystals are observed on the surfaces of MWCNTs (e.g., FIG. 3A-D). In FIG. 3D, the walls of the MWCNTs is clearly observed. Finally, Raman spectra of a region including coated MWCNTs exhibit D and G bands characteristic of MWCNTs (FIG. 6A). The low intensity of these bands, and the low relative intensity of the G band with respect to the relative intensity of the D band are consistent with the presence of a coating on the MWCNTs surface.

Figure 6B:
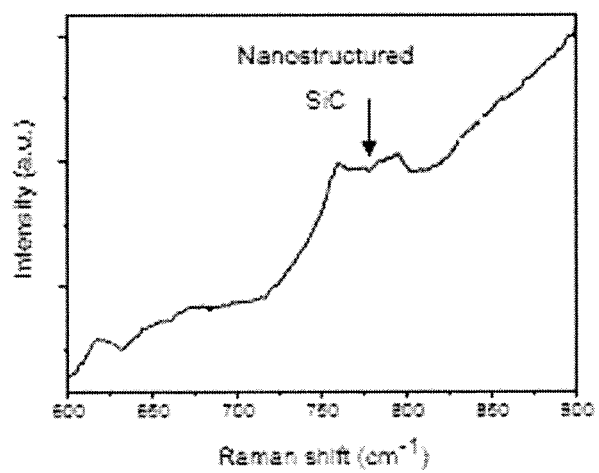
FIG. 6B provides exemplary Raman spectra of a region of a substrate free of coated MWCNTs and diamond crystals.
Figure 12:
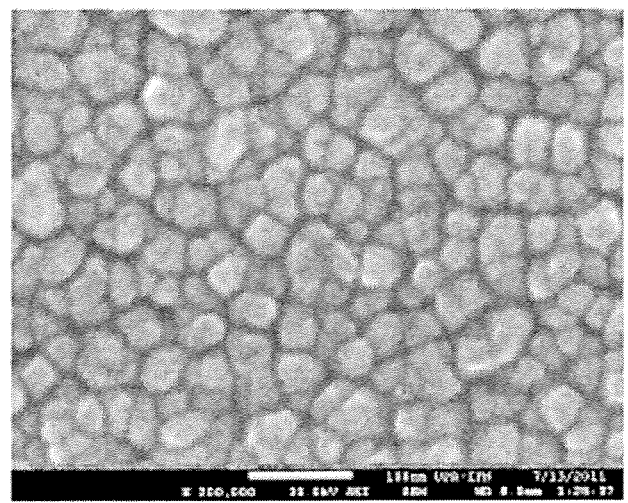
FIG. 12 provides an SEM image showing a region of the substrate free of CNTs and micro-crystalline diamond and which was exposed to the low temperature process leading to CNTs coated by diamond nanocrystals and SiC.

The data also indicate that the MWCNTs are partially coated with SiC grains, indicating that the MWCNTs are conformally coated with a mixture of diamond nanocrystals and SiC grains. For example, EDX analysis performed under TEM, revealed, beside carbon, strong silicon content in the coated MWCNTs, of 41.37%. Additionally, the XRD pattern of FIG. 11 shows a peak at $2\theta \sim 36°$, corresponding to $\beta$-SiC (111). Raman spectra of the nanowires (FIG. 6A) show a broad and low relative intensity band at about 790 $cm^{-1}$, corresponding to the transverse optical phonons of SiC. The broadness of this band is indicative of very short range order. Furthermore, TEM images of the nanowires (FIG. 3) show some similarities with those reported for MWCNTs coated with a nanometer sized SiC layer by the reaction of SiO(g) and CO(g) at temperatures of 1150-1550° C. in vacuum (Morisada & Miyamoto, 2004). In the Morisada & Miyamoto publication, SiC granules, 20 to 200 nm in size, were observed. Finally, in regions free from diamond microcrystals and MWCNTs, a nanostructured film of sub-10 nm grains was observed (FIG. 12). XRD patterns (FIG. 11) and Raman spectra (FIG. 6B) suggest that this is nanostructured SiC. A broad and low intensity band, from about 760 to 800 $cm^{-1}$, from nanostructured SiC, is detected in Raman spectra.

Without being bound by theory, it is believed that the rapid coating of MWCNTs by carbon and SiC from etching of the carbon and silicon solid sources by hydrogen radicals prevents the etching of the MWCNTs by the hydrogen radicals. If CNTs are dispersed on copper substrates and if silicon grease is not used, MWCNTs are not observed but micro- and nanocrystalline diamond are observed. This result is consistent with previous studies reporting the use of MWCNTs to enhance diamond growth. Additionally, when silicon was used as a substrate without using silicon grease, SiC coating of CNTs was not observed which indicates that silicon source is from the silicon grease.

Figures 13A, 13B:
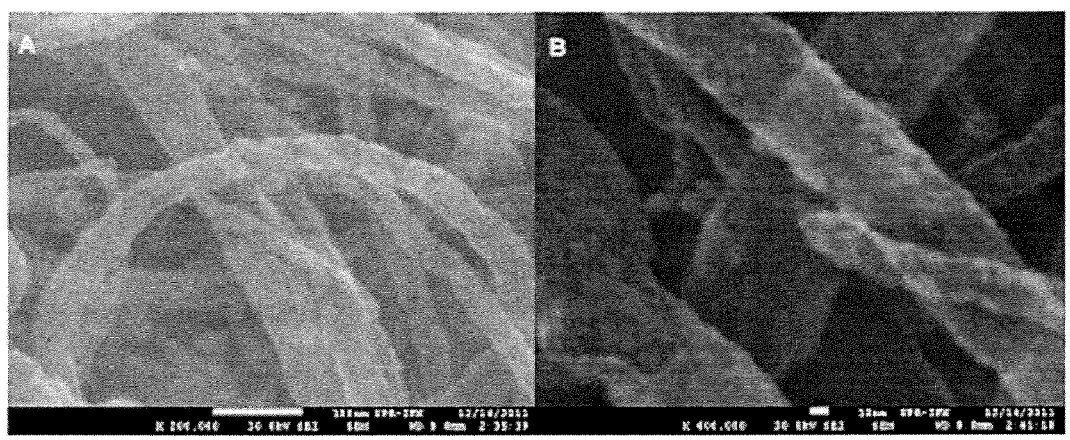
FIG. 13A provides an SEM image of MWCNTs after carburization (without any silicon source).
FIG. 13B provides another SEM image, at different magnification, of MWCNTs after carburization (without any silicon source).

In some cases, it is preferable to carburize the filaments before diamond and/or SiC synthesis. Since the apparatus used did not have a shutter between the filaments and the substrates, the effect of filament carburization on MWCNTs was examined by SEM. FIG. 13 shows SEM micrographs of MWCNTs dispersed on a copper substrate after carburization in the presence of a solid carbon source. In this case, silicon grease was not used. SEM micrographs reveal sub-10 nm grains on the surface of the MWCNTs. A high charging effect under electron beam exposure suggests that the grains are insulating. The grains appear smaller and the coating thinner after carburization than after the diamond synthesis process, which indicates that the coating process continues during the diamond synthesis process. Compared to Raman spectra obtained after the synthetic process (FIG. 6A), Raman spectra obtained after carburization show both, higher D and G relative intensity and $I_G/I_D$ ratio. These observations confirm that MWCNTs are altered more during diamond synthesis than during carburization. EELS spectra and ED patterns exhibit similar characteristics as after diamond synthesis. This indicates that the coating of MWCNTs by NCD initiates during carburization at very low temperatures, around 80° C. Similar observations were made without using a solid carbon source during carburization. In conclusion, coating of MWCNTs is initiated during carburization, with or without a solid carbon source (other than MWCNTs) at around 80° C. This is an interesting result since coating to date has been performed by conventional HFCVD at substrate temperatures above 650° C.

To summarize, a new coating process has been developed to obtain CNTs conformally coated with diamond nanocrystals and/or SiC at low CNT and substrate temperature, down to about 190° C. The synthesis of a hybrid Nano carbon material consisting of CNTs conformally coated with diamond nanocrystals and/or SiC has been successfully demonstrated for the first time, via the exposure of CNTs, solid carbon and/or silicon sources to pure $H_2$ activated by HFCVD. The structure of the MWCNTs is preserved and the coating is highly conformal. The size of the grains is about 10 nm or less. The temperature of the CNT and substrate during the process is about 190° C. Nucleation was shown to initiate during carburization from a high content of $CH_4$ in $H_2$ at substrate temperature below 80° C. This method is suitable for mass-production of CNTs conformally coated with diamond nanocrystals and/or SiC. Potential applications of these hybrid nanostructured carbon materials elaborated from this method include but are not restricted to functional and thermo-resistant composed materials and stable emitters in field emission devices.

All publications and patent applications cited in this specification are herein incorporated by reference as if each individual publication or patent application were specifically and individually indicated to be incorporated by reference. While the claimed subject matter has been described in terms of various embodiments, the skilled artisan will appreciate that various modifications, substitutions, omissions, and changes may be made without departing from the spirit thereof. Accordingly, it is intended that the scope of the subject matter be limited only by the scope and spirit of the following claims, including equivalents thereof.

What is claimed is:

1. A composition comprising conformally coated carbon nanotubes, wherein the carbon nanotubes are conformally coated by diamond nanocrystals and nanostructured silicon carbide.

2. The composition of claim 1 wherein the conformally coated carbon nanotubes have a coating that is at least about 20% by weight diamond nanocrystal and at least about 20% by weight silicon carbide.

3. The composition of claim 1 wherein the conformally coated carbon nanotubes have a coating that is about 60% by weight diamond nanocrystal and about 40% by weight silicon carbide.

4. The composition of claim 1, wherein the conformally coated carbon nanotubes are formed by:
placing the carbon nanotubes on a substrate; and
conformally coating the carbon nanotubes by chemical vapor deposition using a carbon source and a silicon source, wherein the silicon source comprises a silicon grease,
wherein the coating is carried out at a carbon nanotube temperature that is less than about 200° C. and a substrate temperature that is less than about 200° C.

5. The composition of claim 1 wherein the diamond nanocrystals or the nanostructured silicon carbide comprise grains having an average size from about 2 to about 10 nm.

6. The composition of claim 1 wherein the conformally coated carbon nanotubes have a diameter of from about 100 to about 200 nm.

7. The composition of claim 1 wherein the conformally coated carbon nanotubes comprise single-walled tubes.

8. The composition of claim 1 wherein the conformally coated carbon nanotubes comprise multi-walled tubes.

9. The composition of claim 1 wherein the conformally coated carbon nanotubes comprise both single- and multi-walled tubes.

10. The composition of claim 1 wherein the conformally coated carbon nanotubes comprise bundles of tubes.

11. The composition of claim 1 wherein the conformally coated carbon nanotubes comprise isolated tubes.

12. A method of making a conformally coated carbon nanotube comprising the steps of:
a. contacting a substrate with carbon nanotubes in a chemical vapor deposition chamber, the chamber comprising a filament, a solid carbon source etched by hydrogen radicals, and a silicon source, wherein the silicon source comprises a silicon grease; and
b. flowing hydrogen gas over the substrate at a substrate temperature below 200° C. for a time sufficient to conformally coat the carbon nanotube with diamond nano-crystals and nanostructured silicon carbide.

13. The method of claim 12 wherein the substrate temperature is from about 80 to about 200° C.

14. The method of claim 12 wherein the substrate temperature is about 190° C.

15. The method of claim 12 wherein the flowing of hydrogen gas is performed at a pressure from about 5 to about 100 Torr.

16. The method of claim 12 wherein the filament is selected from the group consisting of tungsten, rhenium, tantalum and platinum, and combinations thereof.

17. The method of claim 12, wherein the silicon grease is high vacuum silicon grease.

18. The method of claim 12, wherein the conformally coated carbon nanotubes are randomly dispersed on the substrate.

19. The method of claim 12, wherein the conformally coated carbon nanotubes are distributed in a predetermined pattern on the substrate.

20. The method of claim 12, wherein the carbon nanotubes are pre-dispersed on the surface of a substrate.

21. A conformally coated carbon nanotube produced by the method of claim 12.

22. A conformally coated carbon nanotube, wherein the carbon nanotube is conformally coated by diamond nanocrystals and nanostructured silicon carbide.

23. The conformally coated carbon nanotube of claim 22, wherein the carbon nanotube has a coating that is at least about 20% by weight diamond nanocrystal and at least about 20% by weight silicon carbide.

24. The conformally coated carbon nanotube of claim 23, wherein the carbon nanotube has a coating that is about 60% by weight diamond nanocrystal and about 40% by weight silicon carbide.

25. A film comprising conformally coated carbon nanotubes, wherein the carbon nanotubes are conformally coated by diamond nanocrystals and nanostructured-silicon carbide.

26. A composite material comprising:
conformally coated carbon nanotubes, wherein the carbon nanotubes are conformally coated by diamond nanocrystals and nanostructured silicon carbide; and
a material selected from the group consisting of: a polymeric material, a semiconductor material, a ceramic material, a metal material, and combinations thereof.

27. A consumer or industrial product comprising conformally coated carbon nanotubes, wherein the carbon nanotubes are conformally coated by diamond nanocrystals and nanostructured silicon carbide.

* * * * *